(12) United States Patent  
Haeussler

(10) Patent No.: US 9,358,927 B2  
(45) Date of Patent: Jun. 7, 2016

(54) METHOD AND DEVICE FOR FOLDING IN AT LEAST ONE SIDE MIRROR OF A VEHICLE

(71) Applicant: Robert Bosch GmbH, Stuttgart (DE)

(72) Inventor: Thomas Haeussler, Kuenzelsau-Vogelsberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/597,726

(22) Filed: Jan. 15, 2015

(65) Prior Publication Data

US 2015/0203038 A1  Jul. 23, 2015

(30) Foreign Application Priority Data

Jan. 22, 2014  (DE) .......................... 10 2014 201 139

(51) Int. Cl.
*G06F 7/00* (2006.01)
*B60R 1/00* (2006.01)
*B60R 1/062* (2006.01)
*B60R 21/01* (2006.01)

(52) U.S. Cl.
CPC ................. *B60R 1/006* (2013.01); *B60R 1/062* (2013.01); *B60R 2021/01252* (2013.01)

(58) Field of Classification Search
CPC .................................... G08G 1/16; B60R 1/07
USPC .................. 701/49, 301; 340/426.1
See application file for complete search history.

(56) References Cited

U.S. PATENT DOCUMENTS

| 7,109,854 B2 * | 9/2006 | Dobler et al. ................. 340/435 |
| 8,577,538 B2 * | 11/2013 | Lenser et al. ................... 701/28 |
| 2003/0169160 A1 * | 9/2003 | Rodriguez Barros et al. .......................... 340/426.1 |
| 2004/0181338 A1 * | 9/2004 | Dobler et al. ................. 701/301 |
| 2014/0211333 A1 * | 7/2014 | Lang et al. .................... 359/844 |

FOREIGN PATENT DOCUMENTS

| EP | 970 875 | 1/2000 |
| EP | 1 735 187 | 12/2006 |

OTHER PUBLICATIONS

Scharfenberger et al., Motion Stereo-based Collision Avoidance for an Intelligent Smart Car Door System, 2012, IEEE, p. 1383-1389.*
Alonso et al., Lane-Change Decision Aid System Based on Motion-Driven Vehicle Tracking, 2008, IEEE, p. 2736-2746.*

* cited by examiner

*Primary Examiner* — McDieunel Marc
(74) *Attorney, Agent, or Firm* — Norton Rose Fulbright US LLP

(57) ABSTRACT

A method for folding in at least one side mirror of a vehicle includes: a step of reading in a piece of information about an obstacle avoidance maneuver of the vehicle; and outputting a control signal for displacing the at least one side mirror in response to the piece of information about an obstacle avoidance maneuver of the vehicle.

20 Claims, 2 Drawing Sheets

METHOD AND DEVICE FOR FOLDING IN AT LEAST ONE SIDE MIRROR OF A VEHICLE

BACKGROUND OF THE INVENTION

1. Field of the Invention

The present invention relates to a method for folding in at least one side mirror of a vehicle, to a corresponding device, as well as to a corresponding computer program product.

2. Description of the Related Art

Active safety is one of the focal points when developing present and future motor vehicle systems. Known safety or driver assistance systems in the area of active safety of motor vehicle occupants, i.e., for preventing accidents of the motor vehicle in question, include, for example, ESP (electronic stability program) for stabilizing the motor vehicle with the aid of a brake intervention in the driving dynamics limit range as well as VDM (vehicle dynamic management) as an extension of the ESP by additional steering interventions. A known safety device of such a safety system is, for example, a lane change or obstacle avoidance support for the motor vehicle.

Published European patent application document EP 970 875 A2 provides a safety system for motor vehicles through which a steering actuator of a steer-by-wire steering system of a motor vehicle is influenceable based on information from distance sensors in such a way that a motor vehicle driver may be at least prevented from setting a steering angle resulting in a collision.

European patent EP 1 735 187 B2 provides a safety system for motor vehicles including a steering and a braking device, a collision risk with an obstacle ahead of the motor vehicle being detected and evaluated by the safety system for obstacle avoidance support in emergency situations of the motor vehicle.

BRIEF SUMMARY OF THE INVENTION

Today's side mirrors in motor vehicles, in particular starting from midsize cars, are often designed to be foldable in electronically.

By automatically folding in one or both side mirror(s) of a vehicle based on an obstacle avoidance maneuver of a vehicle resulting from an obstacle, damage to the side mirror and/or a collision of the side mirror with the obstacle may be prevented or at least reduced in its severity.

With the aid of the approach presented here, the folding-in functionality of the exterior or side mirrors of the vehicle may be extended to include the aspect of also automatically carrying out the folding in of the side mirrors during emergency obstacle avoidance maneuvers in order to prevent damage to the side mirror in the event of laterally parking vehicles.

Since in the case of emergency obstacle avoidance maneuvers for pedestrians or other vehicles, for example, it is often a matter of centimeters whether or not a collision will occur, the free obstacle avoidance space for the vehicle may be advantageously increased according to the approach presented here in such a way that a collision may be prevented.

In view of the high relative speeds present, in particular, in the event of collisions with pedestrians or cyclists as well as, for example, with stationary objects, serious injuries and/or expensive vehicle repairs resulting from property damage on the vehicle may be effectively prevented with the aid of the concept presented here.

In one refinement of the concept presented here, only that side mirror or exterior rear-view mirror may be folded in which is closest to the obstacle causing an obstacle avoidance maneuver. In this way, the other side mirror may be advantageously used by the vehicle driver for monitoring the rearward traffic on the obstacle avoidance lane, for example.

The approach described above may be advantageously incorporated into the design of safety devices or safety systems, which are superordinate thereto, since in hazardous situations, average motor vehicle drivers often experience difficulties avoiding an obstacle through appropriate steering maneuvers. For example, driving safety trainings demonstrate that the average motor vehicle driver steers in too late, too fast or too slowly, too much or too little, or not at all, and moreover, carries out a counter-steering, e.g., in the event of a double lane change, i.e., back to the original lane, incorrectly or not at all. This may either result in a collision with an obstacle or instabilities, or even in a skidding of the motor vehicle. There is therefore a plurality of driver assistance systems, short FAS or ADAS (advanced driver assistance systems) in the form of additional electronic or mechatronic devices in motor vehicles for supporting the vehicle driver in critical driving situations. By folding in a side mirror, the potentially available obstacle avoidance space may be enlarged, whereby a collision may be prevented.

A method for folding in at least one side mirror of a vehicle is provided, the method including the following steps:
reading in a piece of information about an obstacle avoidance maneuver of the vehicle; and
outputting a control signal for displacing the at least one side mirror in response to the piece of information about an obstacle avoidance maneuver of the vehicle.

The vehicle may be a road-based vehicle such as a passenger car or a truck. The vehicle may be equipped with two side mirrors, which may be situated on the right and on the left side of the vehicle each in such a way that a driver of the vehicle is able to see the surroundings of the vehicle located on the side and behind the vehicle, without having to turn his/her head. A folding in may be understood to mean a displacing or turning of the mirror face of the side mirror toward the chassis of the vehicle with the intent of making the side mirror stick out less from the chassis than in the unfolded state. The folding in or turning in may be carried out completely or only by a predetermined angle. The goal of the obstacle avoidance maneuver may be preventing a collision of the vehicle with an object. The obstacle avoidance maneuver may be brought about by temporarily changing a steering angle of the vehicle or of a steered axle of the vehicle and may be carried out by the driver of the vehicle and/or an assistance system of the vehicle. The control signal may be output to a servomotor for the side mirror which is designed to activate the side mirror in response to the control signal to move toward the chassis of the vehicle.

According to one specific embodiment of the method, data of a transverse movement of the vehicle in relation to a driving direction of the vehicle may be read in as the piece of information in the step of reading in. This makes it possible to easily and quickly determine a trajectory of the obstacle avoidance maneuver. This piece of information may be used to easily determine whether and to what extent the side mirror must be folded in.

In the step of reading in, data of a steering intervention carried out by a driver of the vehicle may also be read in as the piece of information. This specific embodiment also provides conclusions about the obstacle avoidance trajectory of the vehicle which are important for the folding-in process.

In the step of reading in, data from surroundings sensors of the vehicle with regard to an obstacle detected in the surroundings of the vehicle may furthermore be read in as the piece of information. This specific embodiment may be used to obtain information which is relevant for folding in the side mirror regarding a size, shape, nature, and, possibly, direction and speed of movement of the obstacle in order to prevent or reduce a collision of the side mirror with the obstacle.

In particular, data of the surroundings sensors may be read in in the step of reading in via an interface with a camera of the vehicle. This makes it possible to use already available data transmission paths in an easy and cost-effective manner.

According to another specific embodiment, the piece of information may be read in in the step of reading in via an interface with an obstacle avoidance assistant of the vehicle, which is designed to carry out the obstacle avoidance maneuver. In this way, it is possible to obtain particularly detailed data about the obstacle avoidance maneuver with the aid of already present means.

According to one specific embodiment, data of a direction of the obstacle avoidance maneuver with regard to a driving direction of the vehicle may be read in as the piece of information in the step of reading in. Accordingly, in the step of outputting, the control signal may be output to an interface with a control device of the vehicle, the control device being designed to completely fold in a side mirror which is situated on a side of the vehicle facing away from a direction of the obstacle avoidance maneuver. This specific embodiment ensures the advantage that the side mirror facing away from the obstacle which triggers the obstacle avoidance maneuver may continue to fulfill its function without any restrictions, i.e., to make it possible for the driver to see the traffic events happening behind and/or next to the vehicle.

A device for folding in at least one side mirror of a vehicle is furthermore provided, the device having the following features:

a reading-in device for reading in a piece of information about an obstacle avoidance maneuver of the vehicle; and
an output device for outputting a control signal to an interface with a control device of the vehicle for displacing the at least one side mirror in order to fold in the side mirror in response to the piece of information about an obstacle avoidance maneuver of the vehicle.

The control device may be, for example, an electric motor which is coupled to the side mirror.

The device is designed to carry out or implement the steps of one variant of the method provided herein in its corresponding devices. This embodiment variant of the present invention in the form of a device also makes it possible to achieve the object underlying the present invention rapidly and efficiently.

In the present case, a device may be understood to mean an electrical device which processes sensor signals and outputs control and/or data signals as a function thereof. The device may have an interface which may be designed as hard- and/or software. In the case of a hardware design, the interfaces may, for example, be a part of a so-called system ASIC, which includes various functions of the device. It is, however, also possible that the interfaces are independent, integrated circuits or are at least partially made of discrete components. In the case of a software design, the interfaces may be software modules which are present on a microcontroller in addition to other software modules, for example.

A computer program product having program code is also advantageous, which may be stored on a machine-readable carrier, such as a semiconductor memory, a hard disk memory, or an optical memory, and is used for carrying out the method according to one of the specific embodiments described above, when the program product is run on a computer or a device.

DETAILED DESCRIPTION OF THE INVENTION

Figure 1:
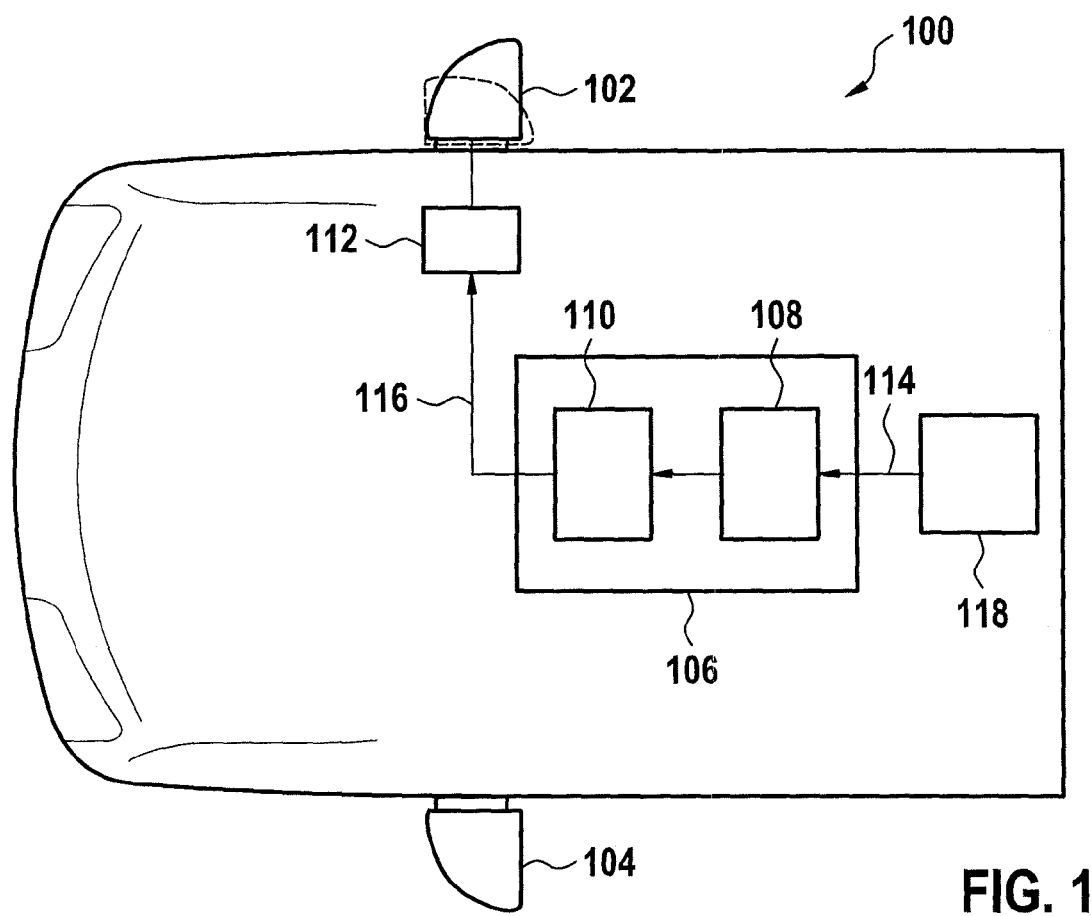
FIG. 1 shows a schematic view of a vehicle including a device for folding in at least one side mirror of the vehicle according to one exemplary embodiment of the present invention.

In the following description of advantageous exemplary embodiments of the present invention, the elements which are illustrated in the various figures and appear to be similar are identified with identical or similar reference numerals; a repetitive description of these elements is dispensed with.

FIG. 1 shows a view on a vehicle 100 including a first or right-hand side mirror 102 and a second or left-hand side mirror 104 on the basis of a schematic view. Vehicle 100 is equipped with a device 106 which has a reading-in device 108 and an output device 110. Furthermore, a control device 112 is shown which is coupled to right-hand side mirror 102 and which is designed to activate right-hand side mirror 102 to move.

Exterior or side mirrors 102, 104 are situated on the right and left sides of vehicle 100, approximately at the height of a driver seat of vehicle 100 and are designed to make it possible for a driver of vehicle 100 to see the traffic events behind and next to vehicle 100, without the driver having to turn his/her head. Control device 112 may, for example, be an electric motor which is electrically coupled to side mirror 102 and which is designed to move right-hand side mirror 102 for the purpose of changing the orientation of the mirror face. In this way, a vehicle driver of vehicle 100 may, for example, displace right-hand side mirror 102 from within vehicle 100 into the position which is optimal for him or her by pushing a button. According to one exemplary embodiment, control device 112 may also have the functionality of automatically folding in right-hand side mirror 102 when vehicle 100 is in a parking position. For illustrating purposes, this is shown in the representation of FIG. 1 of right-hand side mirror 102 with the aid of dashed lines in a folded-in position, as an example. Another control device for displacing left-hand side mirror 104 is not shown in the representation in FIG. 1 for the sake of clarity.

Device 106 is designed to bring about a folding in of at least one side mirror 102, 104 of vehicle 100 in the event of an obstacle avoidance maneuver of vehicle 100 for preventing vehicle 100 from colliding with an obstacle. Accordingly, reading-in device 108 is designed to read in a piece of information 114 about an obstacle avoidance maneuver of vehicle 100. Output device 110 is designed to output a control signal 116 to an interface with control device 112 in response to piece of information 114 for the purpose of folding in right-hand side mirror 102 in the exemplary embodiment shown and to thus prevent a collision of right-hand side mirror 102 with the obstacle. Control device 112 may be a part of device 106 or, as in the exemplary embodiment shown in FIG. 1, it may be coupled to device 106 via a local distance, e.g., with the aid of a CAN bus of vehicle 100.

In the exemplary embodiment shown in FIG. 1, reading-in device 108 receives piece of information 114 about an obstacle avoidance maneuver of vehicle 100 from an obstacle avoidance assistant 118 of vehicle 100. Obstacle avoidance assistant 118 is, in this case, a driver assistance system which assists the driver of vehicle 100 with an obstacle avoidance maneuver with the aid of additional electronic devices. Depending on the implementation of obstacle avoidance assistant 118, many stages of intervention in a steering maneuver by obstacle avoidance assistant 118 are possible, starting from an autonomous implementation of the obstacle avoidance maneuver by obstacle avoidance assistant 118 without an oversteering possibility for the driver and up to outputting a haptic signal to the driver via the steering wheel, for example, in order to merely assist the driver with an obstacle avoidance maneuver which the driver carries out him/herself.

Figure 2:
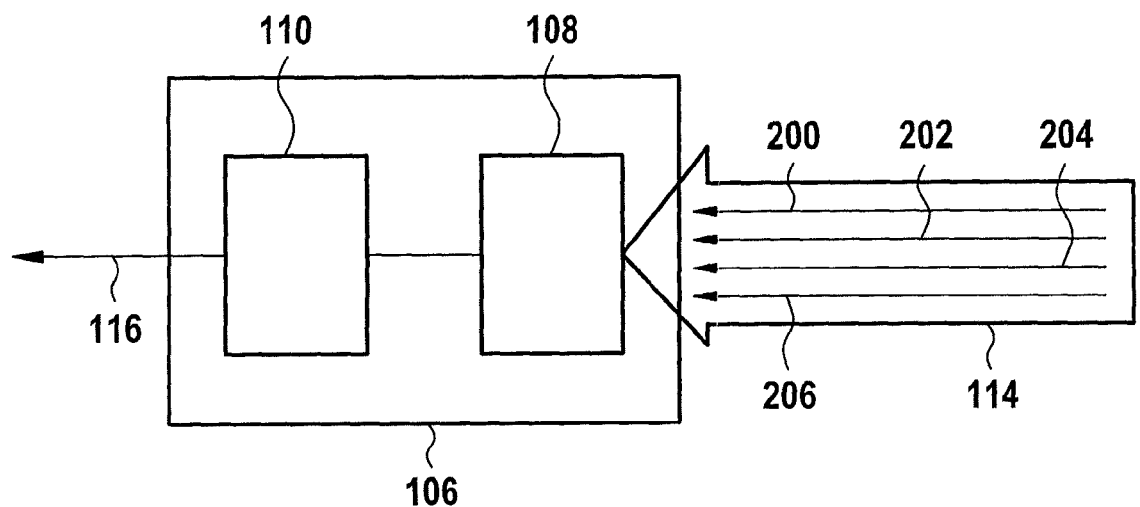
FIG. 2 shows a block diagram of the device from FIG. 1, according to one exemplary embodiment of the present invention.

FIG. 2 shows a block diagram of an exemplary embodiment of device 106 from FIG. 1 for a more precise explanation of a content of piece of information 114 about an obstacle avoidance maneuver of the vehicle.

As is shown in the representation in FIG. 2, reading-in device 108 is designed to read in data 200 of a transverse movement of the vehicle in relation to a driving direction of the vehicle as piece of information 114. Data 200 may include position and time values with regard to the transverse movement. Furthermore, reading-in device 108 is designed to read in data 202 of a steering intervention which is carried out by a driver of the vehicle as piece of information 114. Data 202 may, for example, represent an angle of the steering intervention.

In the exemplary embodiment of device 106 shown in FIG. 2, reading-in device 108 is furthermore designed to read in data 204 of a direction of the obstacle avoidance maneuver with regard to a driving direction of the vehicle as piece of information 114. In this way, device 106 may be provided with the relevant information as to whether the vehicle, which is equipped with device 106, is avoiding an obstacle lying ahead to the right or to the left side.

Reading-in device 108 is also designed to read in data 206 from surroundings sensors of the vehicle with regard to an obstacle detected in the surroundings of the vehicle as piece of information 114. According to one exemplary embodiment, the surroundings sensors may include radar and/or lidar and/or video sensors as well as acceleration sensors situated on the vehicle and may be designed to detect information about the obstacle avoidance maneuver as well as the obstacle in the surroundings of the vehicle which makes the obstacle avoidance maneuver necessary, e.g., a size, a shape, and a position of the obstacle with regard to the vehicle. According to one specific embodiment of device 106, reading-in device 108 is designed to read in data 206 of the surroundings sensors via an interface with a camera of the vehicle.

Alternatively to the exemplary embodiment shown in FIG. 2, reading-in device 108 may be designed to read in only data 200 or data 202 or data 204 or data 206 or any arbitrary combinations of data 200, 202, 204, 206 as piece of information 114 about an obstacle avoidance maneuver of the vehicle.

Figure 3:
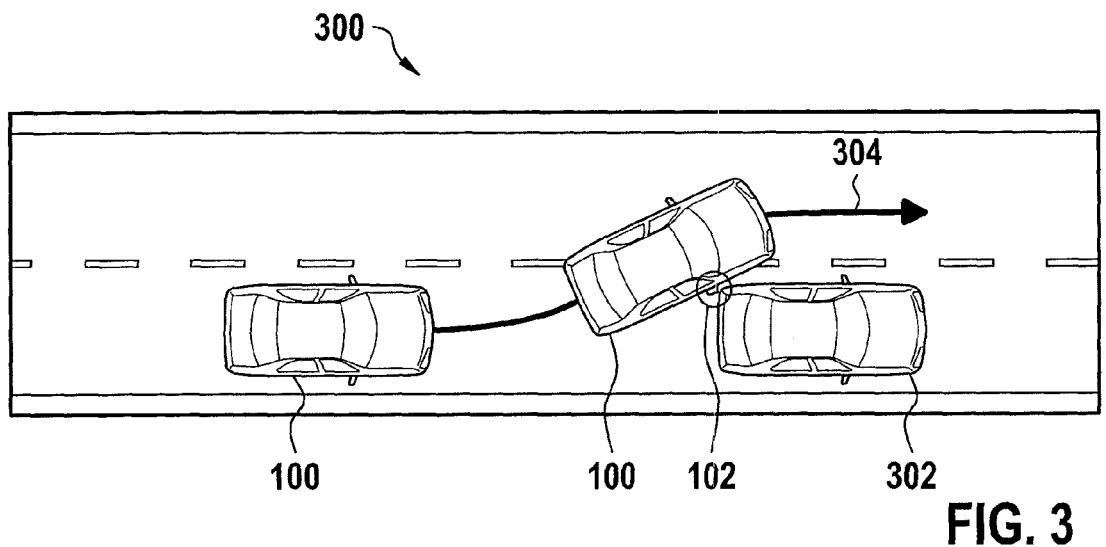
FIG. 3 shows a schematic representation of an obstacle avoidance maneuver of a vehicle with regard to another vehicle, according to one exemplary embodiment of the present invention.
Figure 4:
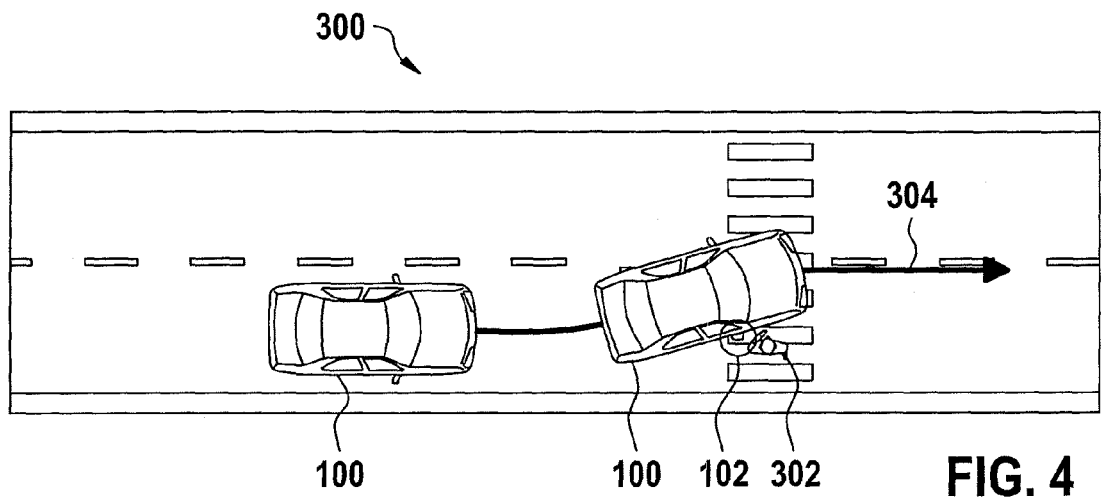
FIG. 4 shows a schematic representation of an obstacle avoidance maneuver of a vehicle with regard to a pedestrian, according to one exemplary embodiment of the present invention.

The following exemplary charts in FIGS. 3 and 4 are supposed to illustrate the safety gain accomplishable by implementing the concepts provided herein.

According to one exemplary embodiment of the present invention, FIG. 3 shows an obstacle avoidance maneuver 300 of a vehicle 100 with regard to an obstacle 302 based on a schematic representation of a traffic scene. A view on a road section is shown, on which vehicle 100, which is equipped with a device for folding in at least one side mirror of a vehicle 100 according to the exemplary embodiments explained above, is carrying out obstacle avoidance maneuver 300 in order to prevent a collision with obstacle 302. The traffic scene in FIG. 3 shows obstacle avoidance maneuver 300 over time, so that vehicle 100 is illustrated prior to and during obstacle avoidance maneuver 300. Obstacle 302 is represented here by another vehicle which is preceding vehicle 100 and with which vehicle 100 would collide without obstacle avoidance maneuver 300.

As is shown in the representation in FIG. 3, vehicle 100 is initially driving on the right-hand driving lane behind preceding vehicle 302 in a driving direction 304, which is identified in the representation with the aid of an arrow, and is subsequently carrying out obstacle avoidance maneuver 300 to the left onto the obstacle avoidance lane, in order to prevent a rear-end collision with preceding vehicle 302. Subsequently, vehicle 100 returns to original driving direction 304. The device for folding in at least one side mirror of vehicle 100, which is situated in vehicle 100, is designed, as already mentioned above, to receive the piece of information about obstacle avoidance maneuver 300 prior to or during obstacle avoidance maneuver 300 and to output, in response thereto, the control signal for folding in at least one side mirror to the appropriate control device.

In the exemplary embodiment shown in FIG. 3, the device according to the present invention is designed to completely fold in the side mirror which is situated on a side of vehicle 100 facing away from a direction of obstacle avoidance maneuver 300. In the case of obstacle avoidance maneuver 300 to the left shown in FIG. 3, there is a collision risk of right-hand side mirror 102 with preceding vehicle 302. Accordingly, the device according to the present invention brings about a folding in of only the right-hand side mirror during obstacle avoidance maneuver 300. The left-hand side mirror of vehicle 100 remains unchanged in its original orientation in this case so that a driver of the vehicle is able to continue observing uninhibitedly the traffic events happening behind vehicle 100 during obstacle avoidance maneuver 300. The device according to the present invention is designed to automatically move right-hand side mirror 102 back into the original position via its control device after the termination of obstacle avoidance maneuver 300.

In another schematic traffic scene, FIG. 4 shows, as an example, another obstacle avoidance maneuver 300 of a vehicle 100, which is equipped with the device for folding in a side mirror, in relation to an obstacle 302. In this case, vehicle 100 is also shown prior to and during obstacle avoidance maneuver 300 which is, in turn, carried out in driving direction 304 to the left from the right-hand driving lane to the left-hand obstacle avoidance lane. Obstacle 302 causing obstacle avoidance maneuver 300 is represented in this case by a pedestrian crossing a crosswalk. As in the exemplary embodiment shown in FIG. 3, the device according to the present invention is designed to bring about a folding in of a side mirror which faces obstacle 302 during obstacle avoidance maneuver 300, in this case again right-hand side mirror 102.

The traffic scene shown in FIG. 4 as an example demonstrates particularly well the advantages of the concept presented here, since in the event of collisions of cars with pedestrians or cyclists, in particular, serious injuries often result in some cases due to the high relative speeds. In contrast, in the event of collisions between vehicles, such as shown in FIG. 3, property damage is rather to be expected. Shock reactions of the drivers due to a contact may, however, also result in more severe consequences of the collision.

In the situations shown in FIGS. 3 and 4, folded-in side mirror 102 is not needed for monitoring the rearward traffic on the obstacle avoidance lane, but only the side mirror facing away from the obstacle, i.e., the left one in the cases shown. In the case of detected obstacle avoidance maneuver 300, side mirror 102, which is closest to obstacle 302, is therefore folded in for the purpose of preventing a collision with obstacle 302. When avoiding the obstacle to the left, right-hand side mirror 102 is concerned and when avoiding the obstacle to the right, the left-hand side mirror is concerned. After the obstacle avoidance maneuver, folded-in side mirror 102 is unfolded, i.e., moved back into its normal position, according to the exemplary embodiments.

As already explained above, the detection of obstacle avoidance maneuver 300 is based in this case on the collision probability with obstacle 302 which is detected by surroundings sensors of vehicle 100, for example, and on the subsequent transverse movement of vehicle 100, e.g., due to a steering intervention by the driver or an intervention by an obstacle avoidance assistant of vehicle 100.

Figure 5:
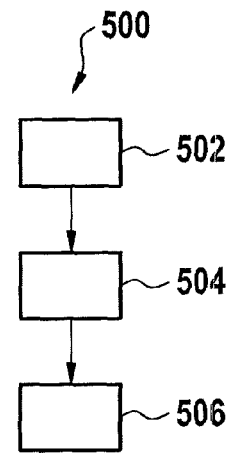
FIG. 5 shows a flow chart of a method for folding in at least one side mirror of a vehicle, according to one exemplary embodiment of the present invention.

FIG. 5 shows a flow chart of an exemplary embodiment of a method 500 for automatically folding in an exterior mirror or a side rear-view mirror of a vehicle which is closest to an obstacle in the event of an emergency obstacle avoidance maneuver. The method may be carried out by an exemplary embodiment of a corresponding device which is explained based on the preceding figures and which is situated in the vehicle.

In a step 502, a piece of information about the obstacle avoidance maneuver is read in into a reading-in device of the device prior to or during an obstacle avoidance maneuver of the vehicle. In response to the piece of information about the obstacle avoidance maneuver, an output device of the device outputs in a step 504 a control signal for folding in a side mirror of the vehicle which is situated on a side of the vehicle facing away from a direction of the obstacle avoidance maneuver to a control device for this side mirror, and the side mirror is automatically folded in. After the termination of the obstacle avoidance maneuver, the output device of the device outputs in a step 506 a resetting signal to the control device in question, and the folded-in side mirror is moved back to its starting position.

The exemplary embodiments described and shown in the figures have only been selected as examples. Different exemplary embodiments may be combined with each other in their entirety or with regard to their individual characteristics. Also, one exemplary embodiment may be supplemented with characteristics of another exemplary embodiment.

Furthermore, the method steps presented here may be repeated and carried out in a sequence different from the one described.

If an exemplary embodiment includes an "and/or" link between a first characteristic and a second characteristic, this should be read in such a way that the exemplary embodiment according to one specific embodiment has both the first characteristic and the second characteristic and according to another specific embodiment it has either only the first characteristic or only the second characteristic.

What is claimed is:

1. A method for folding in at least one side mirror of a vehicle, comprising:

reading in information about an obstacle avoidance maneuver of the vehicle; and outputting a control signal for displacing the at least one side mirror in response to the information about the obstacle avoidance maneuver of the vehicle, wherein an extent of displacement of the at least one side mirror depends on a trajectory of the obstacle avoidance maneuver.

2. The method as recited in claim 1, wherein data of a transverse movement of the vehicle in relation to a driving direction of the vehicle are read in as the information about the obstacle avoidance maneuver of the vehicle.

3. The method as recited in claim 2, wherein the information about the obstacle avoidance maneuver of the vehicle is read in via an interface with an obstacle avoidance assistant of the vehicle configured to carry out the obstacle avoidance maneuver.

4. The method as recited in claim 1, wherein data of a steering intervention carried out by a driver of the vehicle are also read in as the information about the obstacle avoidance maneuver of the vehicle.

5. The method as recited in claim 1, wherein data from at least one surroundings sensors of the vehicle regarding an obstacle detected in the surroundings of the vehicle are read in as the information about the obstacle avoidance maneuver of the vehicle.

6. The method as recited in claim 3, wherein data of the surroundings sensors are read in via an interface with a camera of the vehicle.

7. The method as recited in claim 1, wherein:

data regarding a direction of the obstacle avoidance maneuver in relation to a driving direction of the vehicle are read in as the information about the obstacle avoidance maneuver of the vehicle; and the control signal is output to a control device of the vehicle, the control device being configured to fold in a side mirror which is situated on a side of the vehicle facing away from a direction of the obstacle avoidance maneuver.

8. The method as recited in claim 1, wherein the displacing displaces the side mirror from a starting position to a folded position, the method further comprising:

generating a reset signal in response to which the side mirror is returned to the starting position.

9. The method as recited in claim 8, wherein the reset signal is generated after a termination of the obstacle avoidance maneuver.

10. A device for folding in at least one side mirror of a vehicle, comprising:

a reading-in device for reading in information about an obstacle avoidance maneuver of the vehicle; and an output device for outputting a control signal to a control device of the vehicle for displacing the at least one side mirror in order to fold in the side mirror in response to the information about the obstacle avoidance maneuver of the vehicle, wherein an extent of folding of the side mirror depends on a trajectory of the obstacle avoidance maneuver.

11. The device as recited in claim 10, wherein the displacing displaces the side mirror from a starting position to a folded position, and wherein the output device generates a reset signal in response to which the side mirror is returned to the starting position.

12. The device as recited in claim 11, wherein the reset signal is generated after a termination of the obstacle avoidance maneuver.

13. A non-transitory, computer-readable data storage medium storing a computer program having program codes which, when executed on a computer, perform a method for folding in at least one side mirror of a vehicle, the method comprising:
   reading in information about an obstacle avoidance maneuver of the vehicle; and
   outputting a control signal for displacing the at least one side mirror in response to the information about the obstacle avoidance maneuver of the vehicle, wherein an extent of displacement of the at least one side mirror depends on a trajectory of the obstacle avoidance maneuver.

14. The non-transitory, computer-readable data storage medium as recited in claim 13, wherein the displacing displaces the side mirror from a starting position to a folded position, the method further comprising:
   generating a reset signal in response to which the side mirror is returned to the starting position.

15. The non-transitory, computer-readable data storage medium as recited in claim 14, wherein the reset signal is generated after a termination of the obstacle avoidance maneuver.

16. A method for folding in at least one side mirror of a vehicle, comprising:
   reading in information about an obstacle avoidance maneuver of the vehicle; and outputting a control signal for displacing the at least one side mirror in response to the information about the obstacle avoidance maneuver of the vehicle, wherein:
      data regarding a direction of the obstacle avoidance maneuver in relation to a driving direction of the vehicle are read in as the information about the obstacle avoidance maneuver of the vehicle, and
      the control signal is output to a control device of the vehicle, the control device being configured to fold in a side mirror which is situated on a side of the vehicle facing away from a direction of the obstacle avoidance maneuver.

17. The method as recited in claim 16, wherein data of a transverse movement of the vehicle in relation to a driving direction of the vehicle are read in as the information about the obstacle avoidance maneuver of the vehicle.

18. The method as recited in claim 16, wherein data of a steering intervention carried out by a driver of the vehicle are also read in as the information about the obstacle avoidance maneuver of the vehicle.

19. The method as recited in claim 16, wherein data from at least one surroundings sensors of the vehicle regarding an obstacle detected in the surroundings of the vehicle are read in as the information about the obstacle avoidance maneuver of the vehicle.

20. The method as recited in claim 19, wherein data of the surroundings sensors are read in via an interface with a camera of the vehicle.

* * * * *